May 7, 1963 D. M. ACKERMAN Re. 25,380

LIQUID DISPENSER AND APPLICATOR

Original Filed Feb. 23, 1954

Dolletta M. Ackerman
INVENTOR.

BY J. Wellton Lehmann
Attorney

United States Patent Office

Re. 25,380
Reissued May 7, 1963

25,380

LIQUID DISPENSER AND APPLICATOR

Dolletta M. Ackerman, Los Angeles, Calif., assignor to Pharma-Craft Corporation, Cranbury, N.J., a corporation of Delaware Original No. 2,807,817, dated Oct. 1, 1957, Ser. No. 411,668, Feb. 23, 1954. Application for reissue Oct. 27, 1958, Ser. No. 769,962
6 Claims. (Cl. 15—572)

Matter enclosed in heavy brackets [ ] appears in the original patent but forms no part of this reissue specification; matter printed in italics indicates the additions made by reissue.

This invention relates generally to dispensing devices, and is directed particularly to a dispensing and applicator device designed primarily for a liquid or semi-liquid, and is especially useful for toilet preparations.

One object of the present invention is to provide in a liquid dispenser employing a rotatable ball applicator, an improved seating means for such applicator, which is designed to be fitted into a supporting structure located within the mouth or neck of a receptacle for the liquid.

Another object of the invention is to provide in a liquid dispenser having a rotatable ball applicator, improved means for establishing a fluid tight engagement between the liquid applicator ball and an associated seat engaged thereby, wherein the ball is resiliently or yieldingly held against the seat, when the cover or cap for the receptacle is placed thereon, so as to effectively prevent leakage of the closed receptacle.

Still another object of the invention is to provide an improved liquid applicator device which is designed to be applied to or secured in the mouth or neck portion of a standard bottle or receptacle in which a liquid or toilet preparation is marketed, so that any bottle of liquid or toilet preparation can be converted into a dispenser bottle.

Yet another object of the invention is to provide a liquid applicator device which is embodied in a cap or cover which may be removably attached to the neck portion of a standard bottle or receptacle, and as so attached will form a dispenser and applicator for the liquid contained therein, it being possible to utilize the cap for different bottles by merely transferring it from one bottle to another.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Figure 1:
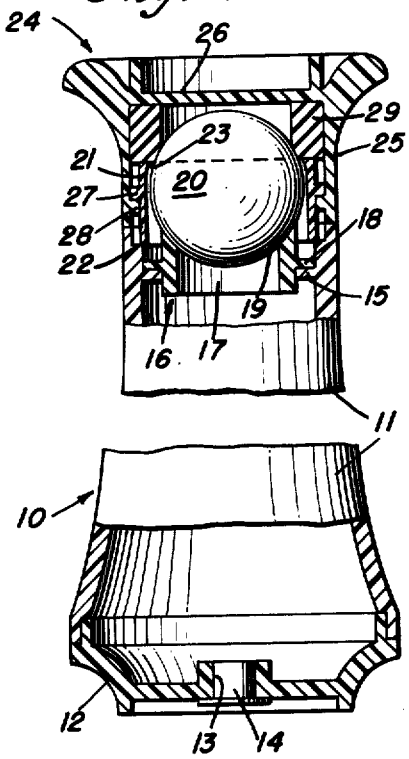
FIG. 1 is a view partly in side elevation and partly in longitudinal section of a receptacle for a liquid, constructed in accordance with the present invention and showing my improved ball seat and resilient ball securing means in the cap, and also the means by which the receptacle may be closed after being filled.

Referring now more particularly to the drawings, the invention is shown in FIG. 1 as being embodied in a receptacle, as generally indicated by the numeral 10, the receptacle having a body portion 11, in the bottom end of which is fitted and sealed a base member 12 which is provided with a central filling opening 13. By inverting the receptacle, it may be filled through this opening, after which the opening in closed by suitable plug 14 of plastic, synthetic rubber or other suitable material which will firmly hold its position or which may be readily cemented to the adjacent material forming the base 12.

The top end of the body 11 is formed so as to provide a neck at this end of the receptacle through which the liquid may be dispensed. Internally, the neck portion is formed with an annular shoulder or flange 15 which serves as a support for a ball seating member 16 which is formed with a cylinder part 17 having a circumferentially extending flange 18 adapted to rest upon the flange 15, when the lowermost end of the cylinder part is snugly fitted within the opening defined by the flange 15. The engaged surfaces of the flanges 15 and 18 may be cemented or bonded in a suitable manner to hold the ball seating member in position and form a fluid tight joint. The upper end of the cylinder part 17 is positioned above the flange 18 and at its top edge is shaped to form an annular seat 19 upon which an applicator ball 20 is adapted to rest.

The receptacle 10 may be formed of any suitable hard material such as a hard plastic or the like, which may be molded and has the suitable characteristic of being impervious to water or other liquids which it may be desired to place in the receptacle. By constructing the ball seating member 16 as a separate member, which may be supported in the neck of the receptacle in the path of flow of liquid therefrom, it is obviously possible to make the seating member of a material more suitable for its purpose, and which may therefore be made of a plastic which is less hard than the receptacle material, and which may have a slight flexibility so as to better adapt it as a seating material.

For retaining the applicator ball in operative position, the ball is encircled by a retainer ring or annulus 21, which fits snugly into the upper end of the receptacle with its lowermost edge adapted to abut an internal shoulder 22 which is formed by slightly increasing the internal diameter of the receptacle at this end. The retainer ring is cemented or bonded to the adjacent surface of the receptacle material so as to form a sealed joint and secure the retainer ring in operative position.

The top edge of the retainer ring 21 is provided with an inturned lip 23 having an internal diameter slightly less than that of the diameter of the ball 20. This lip lies above the center of the ball on the opposite side from the seating member 16 and is arranged to permit limited movement of the ball between the lip and the seat 19 yet prevent the ball from escaping from its mounted position.

By reason of the limited movement of the ball 20, as described above, it will be apparent that when the receptacle is inverted and the ball applied to and moved over a surface with moderate but not excessive pressure, liquid from the receptacle will form a film on the ball and be carried past the lip 23 by the ball rotation and thus dispensed on to the surface.

The retainer ring 21 projects beyond the adjacent mouth or end of the receptacle in order to receive a cap structure, as generally indicated by the numeral 24, which will now be described in detail. The cap structure is in general cup-shaped, having a circular side portion or skirt 25 and a top wall 26. As shown, the skirt 25 is adapted to encircle the retaining ring 21 and seat upon the top edge of the body portion 11, as shown, when in closed position. Various means may be employed for retaining the cap structure in a removably closed position. As illustrative of one way in which this may be accomplished, the retainer ring 21 may be provided on its outer surface with two or more spirally directed ribs 27 which are adapted for operative association with similarly arranged spirally directed ribs 28 adapted to slidably engage beneath the ribs 27 upon turning movement of the cap structure and thus secure the cap in closed position in conventional manner.

The cap structure 24 has positioned within the upper part thereof a ring or gasket 29 of suitable resilient material such as synthetic rubber and the like. This gasket is arranged to be pressed tightly upon the adjacent surface of the applicator ball 20, when the cap structure is affixed in closing position. With the application of pressure to the ball, the ball is firmly pressed downwardly against the seat 19 and thus provides a sealed structure which will obviate leakage of the liquid from the receptacle.

As will be readily apparent, the ball seat and ball 20 cooperate to seal the receptacle when the cap structure is in closed position. The receptacle may at such time be filled with the desired liquid through the opening 13 previously described, this opening thereafter being closed by means of the plug 14.

Figure 3:
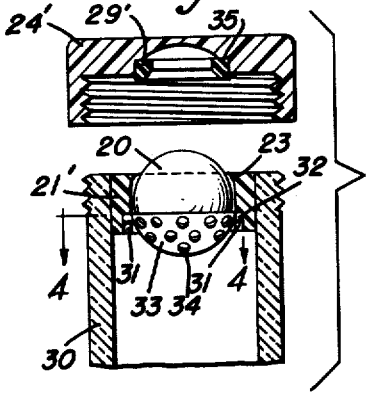
FIG. 3 is a fragmentary view partly in longitudinal section and partly in side elevation of the neck portion of a standard bottle in which liquids and toilet preparations are sold, and showing a dispenser applicator according to a modified form of the present invention applied thereto.
Figure 4:
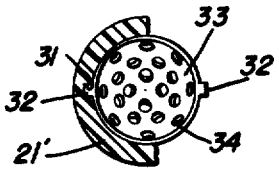
FIG. 4 is a fragmentary detail view showing the interconnection between parts of the arrangement shown in FIG. 3, the ball being removed, and a section being taken substantially on line 4—4 of FIG. 3.

In FIG. 3 there is disclosed an applicator which may be provided as a unit structure designed to be applied to the neck portion 30 of any conventional bottle for a liquid or toilet preparation. In this arrangement, like elements have been indicated by the same numerals as utilized in the arrangement shown in FIG. 1.

In this case, however, the retainer ring 21' has been thickened so as to form in effect a washer of plastic or other suitable material which may be inserted into the bottle mouth in the manner of a stopper. The lowermost edge is formed with diametrically opposed internal notches or grooves 31 which are adapted to respectively receive projections 32—32 in diametric relation and in this case integrally formed with a dished cradle 33 for supporting the applicator ball 20.

The cradle may likewise be made of any suitable material and may be of plastic and is of perforate formation, being provided with a plurality of openings 34 in its surface.

The projections 32 are constructed so as to have a press fit in the associated groove 31, thus providing a simple arrangement for supporting the applicator ball 20 in operative position.

In this construction, the perforated cradle support is of advantage in that it more readily supports a film of the liquid in contact with the applicator ball and facilitates the application of the liquid, especially where the liquid is of rather thick consistency as in the case of certain types of toilet preparations.

As in the case of the arrangement disclosed in FIG. 1, a simplified cap construction 24' is provided in this case, the cap being arranged for removable connection with the bottle neck. Various connections may be utilized, but for purposes of illustration a screw connection is shown although a snap-on cap may be used if desired. In this case, the cap is provided with a central seat groove 35 within which there is positioned a gasket 29' which has sealing engagement with the ball 20, when the associated cap is in closing position with respect to the bottle neck.

Figure 5:
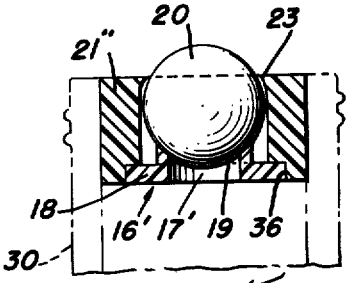
FIG. 5 is a sectional view illustrating another embodiment of the invention arranged to fit into the mouth or neck of a conventional bottle or receptacle.
Figure 2:
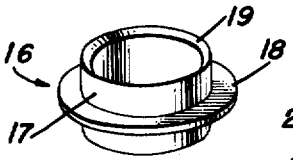
FIG. 2 is a view in perspective of the ball seat.

In FIG. 5, there is disclosed an arrangement similar to that of FIG. 3, except that instead of utilizing the perforated cradle 33, this embodiment uses a modified structure of ball seat member 16 as indicated by numeral 16', in this case. The retainer ring 21'' in this case is provided on its lowermost edge with a circumferentially extending groove 36 instead of the previously described notches 31. This groove is adapted to receive the flange 18 and support the ball seating member 16' in the same manner as previously described. *The encircling flange 18 rests on and is secured to the groove 36 which functions as a portion of an annular flange peripherally extending from the bottom of ring 21 and contacting the neck portion 30.* The cylinder part 17', in this arrangement, extends upwardly only above the flange 18. A seat for the ball is provided in the same manner as previously. In this arrangement, the bottle is sealed by the weight of the ball 20 against the seat 19, when not in use. A cap such as described in connection with FIG. 3 may likewise be used in this arrangement or not, as desired.

Figure 6:
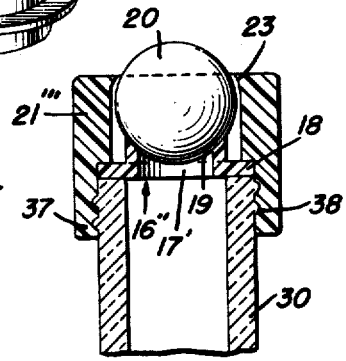
FIG. 6 is another modified arrangement, similar to that shown in FIG. 5, but arranged as a bottle cap adapted to be applied to a conventional bottle or receptacle.

Referring now to FIG. 6, there is disclosed a construction which is quite similar to that of FIG. 5, except that in this form of the invention, the applicator ball and associated ball seating member have been incorporated in a retainer ring 21''', the retainer ring in this case being modified by providing an extended skirt 37 so as to form in this case a cap structure which is arranged for removable engagement with the neck of a conventional bottle. This may be by means of screw threads 38, or other conventional means such as a snap-on connection. With this arrangement, the applicator and dispenser may be transferred from one bottle to another as desired. The construction in this case is simple and yet efficiently operates for the intended purpose.

Various modifications may suggest themselves to those skilled in the art without departing from the spirit of my invention, and, hence, I do not wish to be restricted to the specific form shown or uses mentioned, except to the extent indicated in the appended claims.

*Attention is directed to my Patent 2,719,997, filed July 11, 1952, which issued October 11, 1955. This earlier patent was copending with my application Serial No. 411,688, filed February 23, 1954, which issued as Patent 2,807,817, the patent on which the subject reissue application is filed. Both patents relate to roll-on, ball type, liquid dispensers and applicators.*

I claim:

*1.* A liquid dispenser, comprising: a receptacle having a cylindrical neck portion leading to a mouth; an annular flange within and on the wall of the neck portion below said mouth; a tubular cylindrical member fitting in said flange and having an encircling flange resting on and secured to the first flange, said member having its top end formed to provide a ball seat; a ball resting on said seat; a ring structure fitting in said neck portion and encircling the ball, the ring having a top inside diameter less than the ball diameter and lying above the center of the ball to limit the movement of the ball away from its seat; and a cap overlying the ball and detachably engaged with said ring.

*2. A liquid dispenser, comprising: a receptacle having a cylindrical neck portion leading to a mouth; an annular first flange within and integral with the wall of the neck portion below said mouth; a separate tubular cylindrical member fitting in said first flange and having an encircling second flange integral with said tubular member overlying said first flange and in interface contact therewith, said member having its top end formed to provide a ball seat; a ball resting on said seat; a ring structure fitting in said neck portion and encircling the ball, the ring having a top inside diameter less than the ball diameter and lying above the center of the ball to limit the movement of the ball away from its seat; and a cap overlying the ball and detachably engaged with said ring.*

*3. A liquid dispenser, comprising: a receptacle having a cylindrical neck portion leading to a mouth; a supply of a liquid lotion within said receptacle; an annular flange within and on the wall of the neck portion below said*

*mouth; a tubular cylindrical member fitting in said flange and having an encircling flange resting on and secured to the first flange, said member having its top end formed to provide a ball seat and having a valve port adapted to permit a ball resting on said seat to be in direct contact with the supply of lotion within said receptacle; a ball resting on said seat; a ring structure fitting in said neck portion and encircling the ball, the ring having a top inside diameter less than the ball diameter and lying above the center of the ball to limit the movement of the ball away from its seat; and a cap overlying the ball and detachably engaged with said dispenser.*

*4. A liquid dispenser, comprising: a receptacle having a cylindrical neck portion leading to a mouth; a supply of a liquid lotion within said receptacle; an annular flange within and on the wall of the neck portion below said mouth; a plastic, tubular cylindrical member fitting in said flange and having an encircling flange resting on and secured to the first flange, said member having its top end formed to provide a flexible, plastic ball seat, and having a valve port adapted to permit a ball resting on said seat to be in direct contact with the supply of lotion within said receptacle; a ball resting on said seat; a ring structure fitting in said neck portion and encircling the ball, the ring having a top inside diameter less than the ball diameter and lying above the center of the ball to limit the movement of the ball away from its seat; and a cap overlying the ball and pressing the ball against said seat when the cap is detachably engaged with said dispenser.*

*5. A liquid dispenser, comprising: a receptacle having a cylindrical neck portion leading to a mouth; an annular flange within and on the wall of the neck portion below said mouth; a tubular cylindrical member fitting in said flange and having an encircling flange resting on and secured to the first flange, said member having its top end formed to provide a flexible, plastic ball seat; a ball resting on said seat; a ring structure fitting in said neck portion and encircling the ball, the ring having a top inside diameter less than the ball diameter and lying above the center of the ball to limit the movement of the ball away from its seat; and a cap overlying the ball and pressing the ball against said seat when the cap is detachably engaged with said dispenser.*

*6. The liquid dispenser of claim 4 wherein the annular flange and encircling flange are separate elements that are in interface contact with each other.*

References Cited in the file of this patent or the original patent

UNITED STATES PATENTS

| | | |
|---|---|---|
| 600,299 | Werner | Mar. 8, 1893 |
| 1,129,449 | Bussey | Feb. 23, 1915 |
| 1,977,414 | Testa | Oct. 16, 1934 |
| 2,026,211 | Brennan | Dec. 31, 1935 |
| 2,110,007 | Tefft | Mar. 1, 1938 |
| 2,113,695 | Krannak | Apr. 12, 1938 |
| 2,122,580 | Morris | July 5, 1938 |
| 2,641,788 | Sudbeaz | June 16, 1953 |
| 2,663,891 | Hanryon | Dec. 29, 1953 |
| 2,700,784 | DeBrock | Feb. 1, 1955 |
| 2,719,997 | Ackerman | Oct. 11, 1955 |
| 2,749,566 | Thomas | June 12, 1956 |

FOREIGN PATENTS

| | | |
|---|---|---|
| 144,928 | Australia | Feb. 1, 1952 |
| 817,415 | Germany | Oct. 15, 1951 |
| 828,435 | Germany | June 17, 1952 |
| 1,009,193 | France | Mar. 5, 1952 |